Patented Mar. 9, 1937

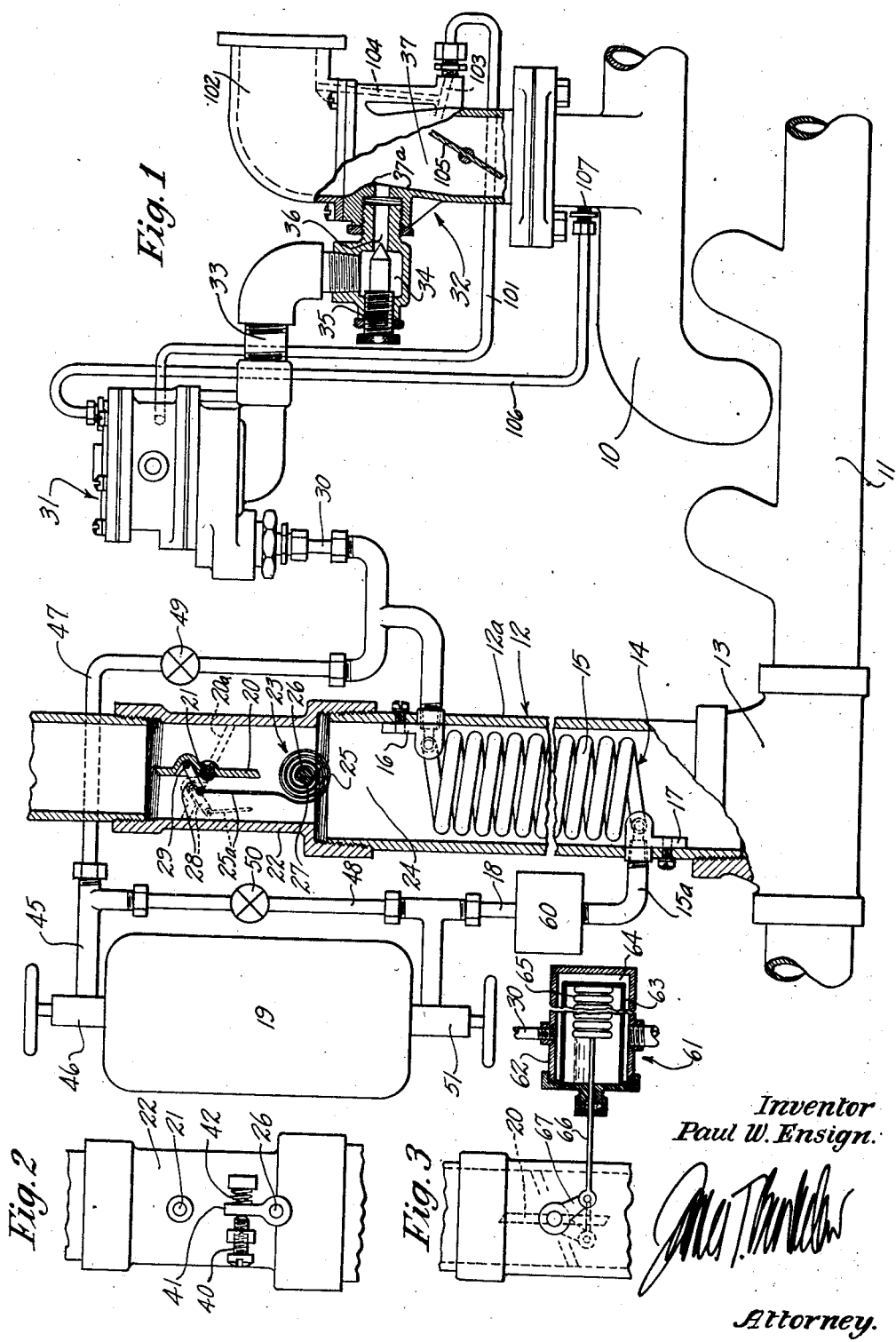

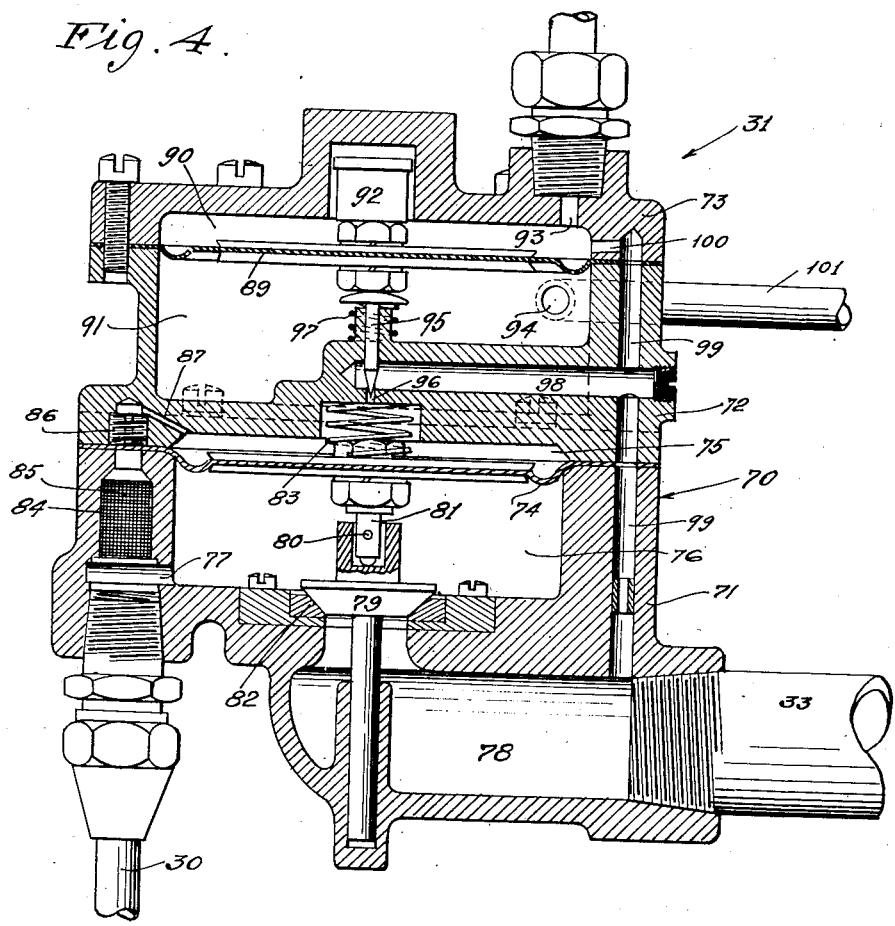

2,073,276

UNITED STATES PATENT OFFICE 2,073,276

SYSTEM FOR SUPPLYING VOLATILE FUELS TO ENGINES

Paul W. Ensign, San Marino, Calif., assignor to Ensign Carburetor Co. Ltd., Huntington Park, Calif., a corporation of California Application August 5, 1933, Serial No. 683,779

5 Claims. (Cl. 123—133)

The objects of this invention are directed to the provision of an improved system for supplying fuel to internal combustion engines, and relate particularly to systems for feeding highly volatile fuels such as mixtures of propane and butane fractions of natural gas. Fuel consisting of these light petroleum fractions is commonly transported and maintained under liquefying pressure in pressure containers, and is frequently used in place of gasoline or other higher priced fuels in outlying districts for the operation of farm engines and the like.

My principal purpose is to provide a simple and economical, though highly efficient, system by means of which the volatile fuel is vaporized and fed to the engine under conditions of temperature and pressure best suited for efficient engine performance. I also propose to overcome such difficulties frequently encountered in fuel supply systems of this character, as excessive cooling and freezing of parts of the equipment due to improperly controlled vaporization and expansion of the volatile liquid fuel, lack of uniformity of temperature conditions where the fuel is vaporized by supplying heat thereto, and the lack of reliably and desirably simple means for automatically maintaining proper and uniform temperature and pressure conditions in the system.

In accordance with the invention, I heat and vaporize the liquid fuel while maintaining it under pressure corresponding to its liquefying pressure at normal atmospheric temperatures, by means of exhaust gases from the engine. The vaporized fuel is released to the engine through a suitable pressure regulator which acts to maintain the fuel at the point of delivery to the manifold intake or carbureter, at a constant predetermined pressure. The invention is most directly concerned with an improved heater and temperature control combination whereby the flow of exhaust gases past the heater is automatically regulated to maintain the vapors leaving the heater at a predetermined temperature. In my preferred form of the invention, I install the fuel heater in the exhaust pipe, or in a branch exhaust pipe, and place a thermostatically operated valve in the exhaust line beyond the heater in the direction of exhaust gas flow. The valve is automatically operated by the thermostat to increase the flow of exhaust gases past the heater when the temperature of the vaporized fuel leaving the heater drops below a predetermined value, and to decrease the flow of exhaust gases past the heater when the fuel vapor temperature exceeds such predetermined value. The system is particularly advantageous and practical by reason of the simplicity and reliability of the exhaust gas control valve and thermostat combination, and the fact that these parts are fully automatic in operation and require no attention, when once properly regulated, to respond to predetermined temperature conditions.

The above features and objects of the invention, as well as the details of a particular and preferred embodiment thereof, will be understood to best advantage from the following description. Reference is made throughout the description to the accompanying drawings, in which:

Fig. 1 is a general view of the fuel supply system, portions of the heater and carbureter being shown in section;

Fig. 2 is a fragmentary elevation illustrating the thermostat adjustment;

Fig. 3 is a fragmentary view showing a variational form of temperature responsive control for the exhaust gas valve, and Fig. 4 is an enlarged sectional detail of the pressure regulator indicated at 31 in Fig. 1.

In the drawings, the engine intake manifold is indicated at 10 and the exhaust manifold at 11, the latter having a branch pipe connection at 12 leading from the T-fitting 13. For the purpose of obtaining a more direct flow of exhaust gases through the branch pipe, a Y-fitting may be substituted for the T-connection 13 if desired. Fuel to be fed to the intake manifold is first heated and vaporized by passage through a suitable heater, generally indicated at 14, installed in the branch exhaust pipe 12. The heater may be of any suitable form and construction, although for greater efficiency, ease in assembling and general simplicity of construction, I make the heater in the form of a spiral pipe coil 15 removably supported at 16 and 17 in section 12a of pipe 12.

Coil 15 connects via line 18 with the fuel tank 19, the latter containing, typically, a volatile mixture of butane and propane fractions at liquefying pressure, say in the neighborhood of 30 to 50 lbs. per sq. in. gage at normal temperatures. By connecting line 18 with the bottom of the fuel container 19, it is assured that only liquid fuel will pass to the heater 14.

The flow of exhaust gases through branch pipe 12 is controlled by a suitable valve or damper 20, preferably of the butterfly type, carried on shaft 21 journaled in body 22 which may be regarded as a continuation of the branch exhaust pipe. The operation of valve 20 is controlled by a suitable temperature responsive means which preferably comprises a thermostat 23 located in the exhaust gas passage 24 at the high pressure side of the valve, that is, the side toward which the gases flow. The typical form of thermostat shown comprises a bimetallic spiral coil 25 carried on rotatably adjustable shaft 26, the inner end of the coil being fastened to the shaft as at 27. The outer end 25a of the thermostat coil extends upward to connect with a link 28 pivotally attached at 29 to the valve. Depending upon temperature conditions in the exhaust gas passage, the valve 20 may be maintained by the thermostat in positions ranging from the illustrated fully open position to closed position indicated by the dotted lines 20a.

Vaporized fuel passes from the heater to the engine manifold through vapor line 30, and interposed in the vapor line is a suitable pressure regulator, generally indicated at 31, which operates to feed the vaporized fuel at constant pressure to the carbureter 32. Any suitable pressure regulator and carbureter, or combination thereof, may be used for the purpose of feeding the fuel to the engine at constant pressure and in proper admixture with air. I may mention however that the regulator comprising the subject-matter of application, Ser. No. 672,053, filed May 20, 1933, by O. H. Ensign on Gas pressure regulator, and the carbureter and regulator combination described in a copending application of Roy F. Ensign, Ser. No. 671,979, filed May 20, 1922, on Gas feed system for internal combustion engines, are particularly suited to the purposes of the present system. From the regulator 31, the vaporized fuel passes at a constant predetermined pressure, say at ½" of water below atmospheric pressure, through line 33 into the nozzle chamber 34, and thence under control of the manually adjustable needle valve 35 through passage 36 into the main fuel and air mixing passage 37 of the carbureter.

Reference is made to the copending application of O. H. Ensign referred to above, for a complete explanation of the structure and operation of regulator 31, and a relatively brief description of the regulator will suffice for a complete understanding of the present invention. Referring to Fig. 4, the body of the regulator generally indicated at 70 is made up of three portions, main portion 71, intermediate portion 72, and a cover portion 73. Primary diaphragm 74 is clamped at its periphery between body portions 71 and 72 to form pressure chambers 75 and 76, respectively above and below the diaphragm. The vaporized fuel enters pressure chamber 76 by way of line 30 and passage 77, and the flow therefrom into regulator delivery passage 78 is controlled by pressure regulating valve 79 which is attached by means of pin 80 to stem 81 depending from the lower side of the primary diaphragm 74, so that the position of the valve is determined by the position of the diaphragm. A valve seat is provided at 82.

Compression spring 83 seats in a recess within body portion 72 and bears against the upper face of diaphragm 74 to press the regulator valve against seat 82. The inlet gas pressure is communicated to the upper side of diaphragm 74 by way of bore 84 containing strainer 85, a bushing 86 having a calibrated orifice to control the gas flow, and a passage 87 communicating with chamber 75.

Pilot diaphragm 89 is clamped between intermediate body portion 72 and cover 73 to form pressure chambers 90 and 91, respectively above and below the diaphragm. A weight 92 rests upon the diaphragm, constantly exerting against the latter a downwardly bearing predetermined force. Ports are provided at 93 and 94 to permit application of modifying fluid pressure above and below the pilot diaphragm, as will be later mentioned. The underside of pilot diaphragm 89 bears against the top of pilot valve 95 which regulates the flow through port 96. This port has an area larger than bushing 86, so that gas may leave chamber 75 somewhat more rapidly than it enters; and the opening of port 96 thus causes a pressure reduction in chamber 75 proportionate to the opening of the pilot valve. Compression spring 97 is a light spring of only sufficient strength to normally raise the valve into open position, and is compressed when diaphragm 89 lowers to close the valve. The gas leaving chamber 75 by way of port 96 enters passage 98 which intersects a vertically extending passage 99 which extends upwardly into communication at 100 with chamber 90, and downwardly into communication with delivery outlet 78.

Port 94 communicates via pipe 101 with the carbureter intake 102 by way of passages 103 and 104, the effect of this communication being to maintain a relatively constant or reference pressure within chamber 91 below the pilot diaphragm. The operation of the regulator 31 is modified when the engine is operating under idling conditions with throttle 105 in relatively closed positions, by placing chamber 90 above the pilot diaphragm in communication with passage 37 at the suction side of the throttle by way of port 93, and pipe 106 leading into the fuel and air mixing passage at 107.

It will suffice to state briefly with reference to the operation of regulator 31, that the depression existing within the Venturi portion 37a of passage 37 is communicated via passage 36, pipe 33, passage 99 and port 100 to the chamber 90 above the pilot diaphragm 89, the depression thus communicated to the diaphragm and resultant upward movement of the diaphragm being proportionate to the flow of air through and depression existing within the venturi 37a. Upward movement of diaphragm 89 causes pilot valve 95 to open, relieving the pressure within chamber 75 by permitting the escape of gas through port 96. Diaphragm 74 thereupon rises to open valve 79 in accordance with the pressure differential existing in chambers 75 and 76. It will be understood that with the pressure in chambers 75 and 76 balanced, as when the engine is not operating, spring 83 acts to close valve 79, and therefore that regulator will operate to deliver gas to the supply line 33 at subatmospheric pressure. During idling operation of the engine, the operation of diaphragm 74 and the main valve 79 are modified as a result of depression communicated via line 106 and port 93 to the upper side of diaphragm 89, the latter in turn actuating valve 95 in accordance with the modifying depression so applied. Reference may be had to the copending application of O. H. Ensign, referred to hereinabove, for a complete explanation of the operation of the pilot diaphragm and pilot valve under idling conditions.

In some instances, and in fact generally, I preferably install in a pressure regulator of suitable type, conventionally indicated at 60, in line 18 between the container 19 and the heater. The purpose of this regulator is to accomplish an initial and partial reduction in the fuel pressure before heating, it being advantageous for various reasons that the pressure reduction take place in stages rather than in a single drop at the final regulator 31. Regulator 60 acts to reduce the pressure to an extent such that while not sufficient to cause cooling to the extent that the feed line and regulator will accumulate frost and the fuel will freeze in the line, a very substantial pressure drop will occur. For example, with the container pressure at say 50 pounds per sq. in. gage, the pressure at the heater side of regulator 60 may be in the neighborhood of 15 pounds per sq. in. gage. In spite of this pressure drop, the fluid in line 15a will be for the most part, liquid and not vapor since the pressure drop is accompanied by a drop in the temperature of the fluid to a point at which, under the pressure existing in line 15a, the fluid can only be liquid. By reason of the installation of the regulator at the inlet side of the heater, even pressure conditions are established within the heater and line between the two regulators, and the system as a whole is less subject to fluctuations.

Another advantage is gained by the installation of a regulator 60 at the inlet side of the heater, in that difficulties in starting operations are obviated by subjecting the liquid fuel to an initial pressure drop at this point. To illustrate: Before the engine is started and before the fuel heater is brought up to normal temperature, the liquid fuel might, in the absence of regulator 60, completely fill the lines and heater coil up to regulator 31. Then, as the engine is started, there would be a pressure drop through regulator 31 from tank pressure to some pressure around atmospheric, and by reason of this comparatively great pressure drop, the cooling effect would be such as to cause a rapid accumulation of frost on and possible freezing of regulator 31. By installing regulator 60, and thereby taking the total pressure drop in two stages, sufficient volatilization may take place at the expansion side of the first regulator, at even the lower starting temperature conditions at the heater, to provide ample vaporized fuel to be fed to the engine until the temperatures in the system are brought up to those corresponding to normal operating conditions. In the foregoing, I have specified a typical pressure drop that may occur at regulator 60, although it is observed that the pressure reduction at this point may be regulated to suit particular atmospheric temperature conditions or temperature conditions in the system.

I preferably extend the exhaust pipe branch upwardly, rather than downwardly, from the main pipe 11, and preferably feed into the lower, instead of the upper end of the heater coil. This is done primarily for the reason that as the fuel becomes heated and vapors generated, the vapors may rise from the surface of the liquid in the coil into a free vapor space above, rather than being required to bubble up through the liquid as would be the case were the fuel fed into the upper end of the coil and progressively heated to higher temperatures in its downward flow. Here the vapor release occurs smoothly and without causing any substantial turbulence within the heater coil.

In the operation of the system, liquid fuel supplied to the heater 14 is heated and vaporized, although preferably the conditions of heating will be so regulated that the vapors will not become superheated to any great extent. My main object is to convert the fuel to vapor form, with the vapors at sufficient temperature to prevent condensation in vapor line 30 or in regulator 31 prior to the reduction of pressure into line 33. Preferably, the vapors will not be greatly superheated, but instead, the fuel will only be heated sufficiently to vaporize the liquid and raise the temperature of the vapors above the point at which condensation will occur in the vapor line. Observations have indicated that for satisfactory operation the vapor temperature may be from 120° to 150° F. and the thermostat 23 is adjusted to maintain substantially these vapor temperatures. The operation of the thermostat is such that when temperatures in the heater exceed the desired values, valve 20 may be moved toward closed position to restrict the flow of exhaust gases through pipe 12 and consequently reduce the supply of heat to the coil 15. The converse takes place when temperatures in the heater drop too low. The action of the thermostat is such that when the temperatures in the vapor line and exhaust gas passage become too high, the bimetallic coil 25 expands to swing link 28 toward the left and to move the valve toward closed position. When the temperatures in passage 25 fall below the proper degree, the thermostat coil contracts, swinging the valve toward open position to allow increased flow of exhaust gases through the passage to restore the temperature to normal.

The thermostat may be regulated to cause it to operate in the manner described at any predetermined temperature, by the simple adjustment shown in Fig. 2. The adjustment consists of set screw 40 bearing against an arm 41 carried on shaft 26, the arm and shaft assembly being maintained in adjusted position by the thrust of spring 42. By adjustment of set screw 40, shaft 26 is turned to vary the tension of the thermostat coil, and thereby predetermine its reaction in accordance with particular temperature conditions which it is desired to maintain in the exhaust gas passage.

The pressure regulator 31, in addition to feeding the vaporized fuel to the carbureter at constant pressure, also maintains a back pressure in line 30 such that during its heating and vaporization in heater 14, the fuel is maintained at a pressure at least as great as that existing at the outlet of regulator 60. Fuel passes through the heater and regulator only as required by the engine, and that by no possibility, due to the thermostatic temperature control, can excessive temperatures and pressures build up in the system.

To facilitate starting operations and to obviate any difficulties that might arise as a result of feeding liquid fuel to the engine before the heater is brought up to temperatures necessary for proper vaporization of the liquid fuel, I may operate the engine on the vaporized fuel taken from the top of the container 19 above the level of liquid fuel therein. For the purpose of feeding the vapor from the container to the engine, I provide an outlet line 45, the flow through which is controlled by a valve 46. The outlet 45 may connect directly by a pipe 47 with vapor line 30 at the outlet side of the heater, or with the heater inlet 15a by way of line 48. The vapors may be selectively directed through either line 47 or 48 by valves 49 and 50. The supply of liquid fuel through line 18 to the heater is controlled by valve 51.

During starting operations valve 51 may at first be closed, valve 46 opened and the engine fuel supply taken as vapors through the outlet 45. As previously mentioned these vapors may pass directly through line 47 to vapor line 30, or the vapors may be passed via line 48 through the heater. After the engine has warmed up and normal operating temperatures established in the fuel heater, valve 46 may be closed and valve 51 opened so as to continue operations on liquid fuel feed.

In Fig. 3 I show a variational form of the invention in which the exhaust gas damper, instead of being controlled by a thermostat located directly in the exhaust gas passage, is operated by a temperature responsive device, generally indicated at 61, installed in the vapor line 30 leading from the heater to regulator 31. While various forms of thermostats or temperature responsive mechanisms may be used to accomplish my purpose, I show a typical device 61 comprising shells 62 and 63 forming a space 64 through which the vapors pass, and a temperature responsive bellows 65 connected via rod 66 with arm 67 of valve 20. Chamber 64 contains a suitable heat conductive fluid acting as a transfer medium for heat passing from the vapors in space 64 to the bellows. As the vapor temperature increases, the bellows 65 expands to move the valve toward closed position; and conversely as the vapor temperature drops.

While in the one instance the thermostat in the exhaust gas passage is contacted by exhaust gases, and in the variational form the thermostat is contacted by the vapors, both devices act to regulate the flow of exhaust gases, and therefore temperature conditions in the heater, in accordance with the desired vapor temperature. As previously mentioned, in the first instance the thermostat, while contacted only by exhaust gases, may be set to conform in its operation to certain selected temperatures to be maintained in the vapor line.

It will be understood that the drawings are merely illustrative of a typical and preferred fuel supply system, and that various changes and modifications therein may be made without departure from the intended spirit and scope of the invention.

I claim:

1. In apparatus for supplying an engine manifold with volatile fuels of the character described, a fuel heater and vaporizer, means for feeding fuel to said heater, said means comprising a pressure vessel containing fuel that volatilizes at normal atmospheric temperatures but which is maintained in said vessel under liquefying pressure, a line conducting liquid fuel from said vessel to the heater and a pressure reducing valve in said line, means for supplying heat to said heater from engine exhaust gases, means for automatically controlling the heat supplied to said heater in accordance with the temperature of the vapors leaving said heater, a vapor line connecting said heater with the manifold, and a pressure regulator in said vapor line for feeding vaporized fuel to the manifold at constant pressure.

2. In apparatus for supplying an engine manifold with volatile fuels of the character described, the combination comprising a vessel containing liquefied fuel under pressure, a heater and a pipe connecting said heater with the manifold, a line for supplying fuel to the heater, a vapor conducting pipe connecting said vessel above the liquid level therein with said line, and a liquid fuel carrying pipe connecting said vessel below the liquid level therein with said line.

3. In apparatus for supplying an engine manifold with volatile fuels of the character described, the combination comprising a vessel containing liquefied fuel under pressure, a line for supplying fuel to the manifold, a vapor conducting pipe connecting said vessel above the liquid level therein with said line, a liquid fuel carrying pipe connecting said vessel below the liquid level therein with said line, and means for selectively controlling the delivery of vapor or liquid fuel to said line via said pipes.

4. In apparatus for supplying an engine manifold with volatile fuels of the character described, the combination comprising a vessel containing liquefied fuel under pressure, a heater and a pipe connecting said heater with the manifold, a line for supplying fuel to the heater, a vapor conducting pipe connecting said vessel above the liquid level therein with said line, and a liquid fuel carrying pipe connecting said vessel below the liquid level therein with said line, and valves for selectively controlling the delivery of vapor or liquid from said vessel to the heater.

5. In apparatus for supplying an engine manifold with volatile fuels of the character described, the combination comprising, a fuel container in which liquid fuel is maintained under pressure, means for heating and vaporizing the liquid fuel by engine exhaust gases discharged through a passage, said means comprising a valve in said passage and temperature responsive means for operating the valve, a line connecting said container with the heater, a pressure reducing valve in said line, a vapor line leading from said heater, and a pressure reducing valve in the vapor line.

PAUL W. ENSIGN.